US012766970B2

(12) United States Patent
Eskenazi-Gold et al.

(10) Patent No.: US 12,766,970 B2
(45) Date of Patent: Oct. 20, 2026

(54) POWER DISSIPATION CONTROL BASED ON PREDICTED FRICTION BRAKE OVERHEATING IN ELECTRIFIED VEHICLES

(71) Applicant: FCA US LLC, Auburn Hills, MI (US)

(72) Inventors: Alexander Eskenazi-Gold, Ferndale, MI (US); Shawali Chaudhury, Bluff Dale, TX (US); Joseph Falcon, Saline, MI (US)

(73) Assignee: FCA US LLC, Auburn Hills, MI (US)

( * ) Notice: Subject to any disclaimer, the term of this patent is extended or adjusted under 35 U.S.C. 154(b) by 178 days.

(21) Appl. No.: 18/535,504

(22) Filed: Dec. 11, 2023

(65) Prior Publication Data

US 2025/0187446 A1 Jun. 12, 2025

(51) Int. Cl.
*B60L 7/26* (2006.01)
*B60L 1/00* (2006.01)
(Continued)

(52) U.S. Cl.
CPC *B60L 7/26* (2013.01); *B60L 1/00* (2013.01); *B60W 10/08* (2013.01); *B60W 10/184* (2013.01); *B60W 10/198* (2013.01); *B60W 10/30* (2013.01); *B60W 20/12* (2016.01); *B60W 30/18127* (2013.01); *B60W 30/18136* (2013.01); *B60W 40/12* (2013.01); *B60L 2240/36* (2013.01); *B60L 2240/642* (2013.01); *B60W 2400/00* (2013.01); *B60W 2510/184* (2013.01); *B60W 2552/15* (2020.02); *B60W 2710/06* (2013.01); *B60W 2710/08* (2013.01); *B60W 2710/18* (2013.01); *B60W 2710/305* (2013.01)

(58) Field of Classification Search
CPC .......... B60L 7/26; B60L 1/00; B60L 2240/36; B60L 2240/642; B60W 10/08; B60W 10/184; B60W 10/198; B60W 10/30; B60W 20/12; B60W 30/18127; B60W 30/18136; B60W 40/12; B60W 2400/00; B60W 2510/184; B60W 2552/15; B60W 2710/06; B60W 2710/08; B60W 2710/18; B60W 2710/305
See application file for complete search history.

(56) References Cited

U.S. PATENT DOCUMENTS 10,654,462 B2 5/2020 Hecker et al.
11,047,439 B2 6/2021 Robere et al.
(Continued)

*Primary Examiner* — Brian P Sweeney
(74) *Attorney, Agent, or Firm* — Jeremy J. Klobucar

(57) ABSTRACT

A control system for an electrified vehicle includes a friction brake system configured to apply a frictional force to a driveline system of the electrified vehicle to decelerate the electrified vehicle and a controller configured to detect an upcoming downhill grade and, in response to detecting the upcoming downhill grade, predict a thermal parameter of the friction brake system during the upcoming downhill grade and control enablement/disablement of a power dissipation mode of the electrified vehicle when the predicted thermal parameter exceeds a thermal parameter threshold corresponding to overheating of the friction brake system, wherein the power dissipation mode includes intentionally dissipating at least some of the electrified vehicle's potential energy using a set of power dissipation components of the electrified vehicle.

16 Claims, 3 Drawing Sheets

(51) Int. Cl.

| | |
|---|---|
| ***B60W 10/08*** | (2006.01) |
| ***B60W 10/184*** | (2012.01) |
| ***B60W 10/198*** | (2012.01) |
| ***B60W 10/30*** | (2006.01) |
| ***B60W 20/12*** | (2016.01) |
| ***B60W 30/18*** | (2012.01) |
| ***B60W 40/12*** | (2012.01) |

(56) References Cited

U.S. PATENT DOCUMENTS

| | | | | |
|---|---|---|---|---|
| 2004/0262096 | A1 | 12/2004 | Hageman et al. | |
| 2017/0259806 | A1* | 9/2017 | Kava | B60K 6/48 |
| 2018/0244157 | A1* | 8/2018 | Hirakawa | B60L 7/18 |
| 2025/0018826 | A1* | 1/2025 | Cao | B60L 58/26 |

* cited by examiner

POWER DISSIPATION CONTROL BASED ON PREDICTED FRICTION BRAKE OVERHEATING IN ELECTRIFIED VEHICLES

FIELD

The present application generally relates to electrified vehicles and, more particularly, to techniques for enabling/disabling a power dissipation mode based on predicted friction brake overheating in electrified vehicles.

BACKGROUND

An electrified vehicle typically includes both a regenerative braking system and a conventional friction brake system. In some instances, a battery system of the electrified vehicle may be fully charged and thus the regenerative braking system is unavailable. In these instances, the conventional friction brake system is utilized to decelerate or regulate a speed of the electrified vehicle. During extended downhill grade scenarios, the conventional friction brake system of the electrified vehicle could overheat due to excessive operation. One conventional solution to these problems is to add additional energy storage systems (capacitors, battery systems, etc.) and/or large resistor banks for thermal dissipation to extend the availability of the regenerative braking system, but these systems significantly increase vehicle weight and costs and create yet another barrier to entry for the electrified vehicle space. Another conventional solution is utilizing a larger friction brake system and/or a more air-cooled (i.e., less aerodynamic) friction brake system, but this solution also increases vehicle costs and/or weight. Accordingly, while such conventional electrified vehicle control systems do work well for their intended purpose, there exists an opportunity for improvement in the relevant art.

SUMMARY

According to one example aspect of the invention, a control system for an electrified vehicle is presented. In one exemplary implementation, the control system comprises a friction brake system configured to apply a frictional force to a driveline system of the electrified vehicle to decelerate the electrified vehicle and a controller configured to detect an upcoming downhill grade and, in response to detecting the upcoming downhill grade, predict a thermal parameter of the friction brake system during the upcoming downhill grade and control enablement/disablement of a power dissipation mode of the electrified vehicle when the predicted thermal parameter exceeds a thermal parameter threshold corresponding to overheating of the friction brake system, wherein the power dissipation mode includes intentionally dissipating at least some of the electrified vehicle's potential energy using a set of power dissipation components of the electrified vehicle.

In some implementations, the predicted thermal parameter is a modeled temperature of the friction brake system. In some implementations, the controller is configured to access a temperature model for the friction brake system by a separate controller associated with the friction brake system, and wherein the temperature model is configured to model the temperature of the friction brake system based on a set of input parameters. In some implementations, the controller is a supervisory controller or a hybrid control processor (HCP) and the separate controller associated with the friction brake system is a body control module (BCM) or brake system module (BSM).

In some implementations, the thermal parameter is an energy accumulated by the friction brake system. In some implementations, actuation periods of the friction brake system add energy to the friction brake system and increase its temperature, and wherein non-actuation periods of the friction brake system dissipate energy from the friction brake system and decrease its temperature. In some implementations, the thermal parameter threshold is an accumulated energy by the friction brake system that corresponds to an overheat temperature of the friction brake system.

In some implementations, the set of power dissipation components includes a regenerative braking system of the electrified vehicle. In some implementations, the set of power dissipation components includes an engine of the electrified powertrain, and wherein motoring the engine consumes at least some kinetic energy of the electrified vehicle during the downhill grade In some implementations, the set of power dissipation components further includes one or more accessory loads each configured to be powered by a high voltage battery system associated with the regenerative braking system.

According to another example aspect of the invention, a control method for an electrified vehicle is presented. In one exemplary implementation, the control method comprises detecting, by a controller of the electrified vehicle, an upcoming downhill grade and, in response to detecting the upcoming downhill grade, predicting, by the controller, a thermal parameter of a friction brake system of the electrified vehicle during the upcoming downhill grade, wherein the friction brake system is configured to apply a frictional force to a driveline system of the electrified vehicle to decelerate the electrified vehicle and controlling, by the controller, enablement/disablement of a power dissipation mode of the electrified vehicle when the predicted thermal parameter exceeds a thermal parameter threshold corresponding to overheating of the friction brake system, wherein the power dissipation mode includes intentionally dissipating at least some of the electrified vehicle's potential energy using a set of power dissipation components of the electrified vehicle.

In some implementations, the predicted thermal parameter is a modeled temperature of the friction brake system. In some implementations, the method further comprises accessing, by the controller, a temperature model for the friction brake system from a separate controller associated with the friction brake system, wherein the temperature model is configured to model the temperature of the friction brake system based on a set of input parameters. In some implementations, the controller is a supervisory controller or HCP and the separate controller associated with the friction brake system is a BCM or BSM.

In some implementations, the thermal parameter is an energy accumulated by the friction brake system. In some implementations, actuation periods of the friction brake system add energy to the friction brake system and increase its temperature, and wherein non-actuation periods of the friction brake system dissipate energy from the friction brake system and decrease its temperature. In some implementations, the thermal parameter threshold is an accumulated energy by the friction brake system that corresponds to an overheat temperature of the friction brake system.

In some implementations, the set of power dissipation components includes a regenerative braking system of the electrified vehicle. In some implementations, the set of power dissipation components includes an engine of the electrified powertrain, and wherein motoring the engine consumes at least some kinetic energy of the electrified vehicle during the downhill grade In some implementations, the set of power dissipation components further includes one or more accessory loads each configured to be powered by a high voltage battery system associated with the regenerative braking system.

Further areas of applicability of the teachings of the present application will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present application are intended to be within the scope of the present application.

DESCRIPTION

Figure 1:
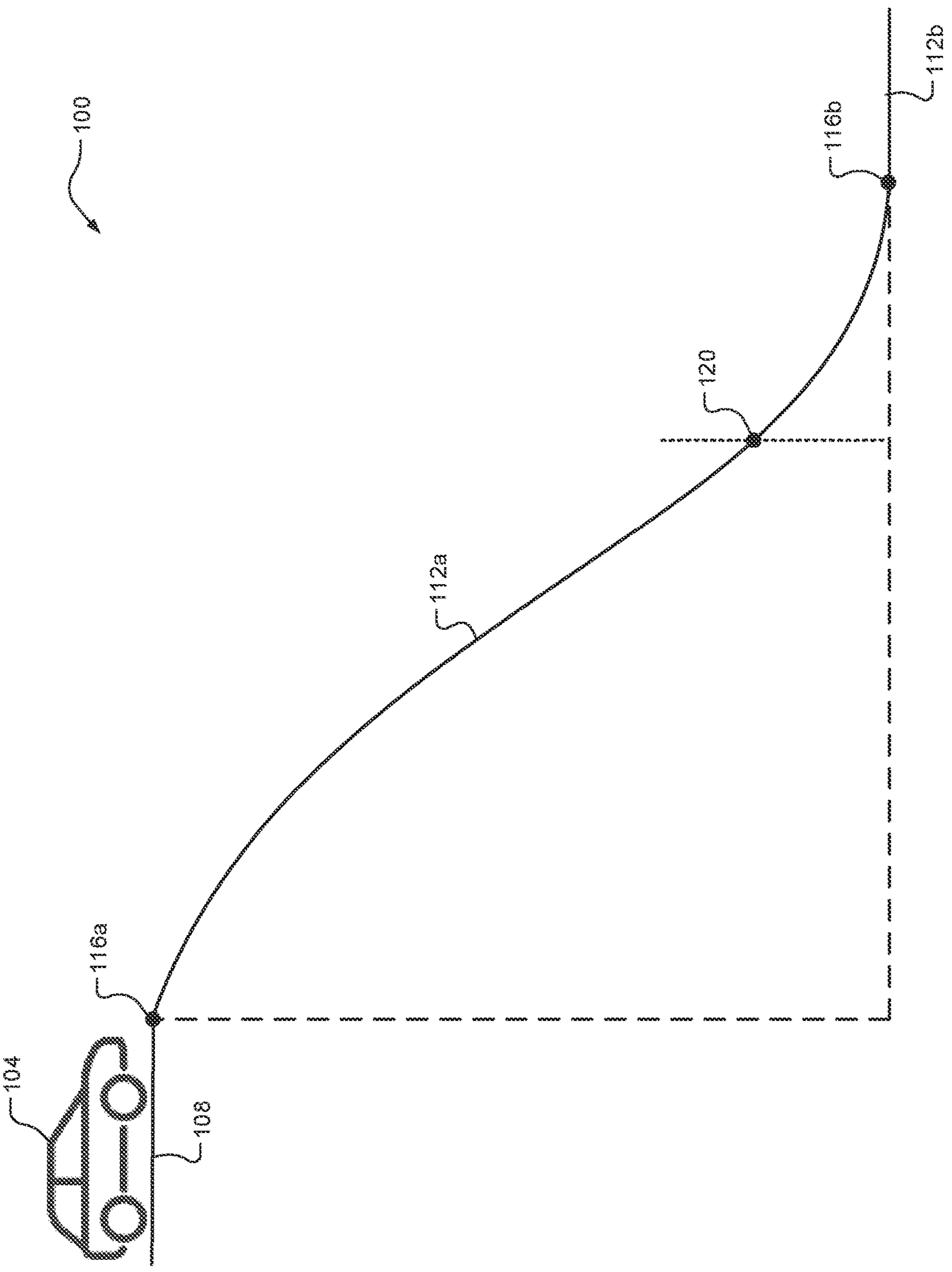
FIG. 1 is a diagram of an electrified vehicle approaching an extended downhill grade and predicting overheating of its friction brake system according to the principles of the present application.

As previously discussed, a battery system of an electrified vehicle may be fully charged and the regenerative braking system could thus be unavailable. In these instances, a conventional friction brake system is utilized to decelerate or regulate a speed of the electrified vehicle. During extended downhill grade scenarios, the conventional friction brake system of the electrified vehicle could overheat due to excessive operation. One conventional solution to these problems is to add additional energy storage systems (capacitors, battery systems, etc.) and/or large resistor banks for thermal dissipation to extend the availability of the regenerative braking system, but these systems significantly increase vehicle weight and costs and create yet another barrier to entry for the electrified vehicle space. Another conventional solution is utilizing a larger friction brake system and/or a more air-cooled (i.e., less aerodynamic) friction brake system, but this solution also increases vehicle costs and/or weight. Accordingly, the present application is directed to techniques that intelligently enable/disable a power dissipation or "e-burn" mode of an electrified vehicle where electrical energy is intentionally dissipated or "burned off" based on predicted overheating of the vehicle's friction brake system. Potential benefits of these techniques include utilizing smaller and/or less air-cooled friction brake systems, thereby decreasing vehicle costs/weight and/or improving aerodynamic efficiency.

These techniques estimate an accumulated energy by the friction braking system over time. For example, friction braking events (e.g., braking force) add energy, and the accumulated energy also decays over time as the friction brake system is air cooled. In one exemplary implementation, these techniques utilize a friction brake system temperature model that is stored at another controller (e.g., a body control module, or BCM) on a controller area network (CAN) and accessed by a controller executing these techniques (e.g., a supervisory controller or hybrid control processor, or HCP). The modeled friction brake temperature could then be utilized instead of estimated accumulated energy for controlling enabling/disabling of the power dissipation mode. By proactively enabling the power dissipation mode, a conventional driver warning (e.g., "Brake System Overheating") is at least temporarily avoided, although it could still eventually be sent to the driver in the event that the predictive and proactive power dissipation enablement techniques of the present application were unable to fully handle the power dissipation necessary during the downhill grade. If the driver continues to operate the friction brake system after being provided the driver warning, there could be brake fade (i.e., a loss of brake pressure due to boiling of brake fluid), which is a potential safety issue. The driver warning is intended to instruct the driver to temporarily stop the electrified vehicle to let the friction brake system cool and avoid such a loss of brake pressure.

Referring now to FIG. 1, a diagram 100 of an electrified vehicle 104 traveling along a road 108 and an approaching or upcoming extended downhill grade portion **112*a* of the road 108 and predicting overheating of its friction brake system (see point 120) according to the principles of the present application is illustrated. To begin, the electrified vehicle 104 is on a flat portion of the road 108 and the upcoming downhill grade portion 112*a* is ahead. This downhill grade portion 112 is defined between points 116*a* and 116*b*, and after point 116*b* the road 108 levels out to another flat portion 112*b*. At the top of the hill, the electrified vehicle 104 has a large amount of potential energy. This potential energy is due to gravity and the relative distance of the electrified vehicle 104 from a center of the Earth (i.e., compared to if the electrified vehicle 104 were at the bottom of the hill on flat road portion 112*b*). The potential energy of the electrified vehicle 104 can be calculated by the electrified vehicle 104 based on the height of the hill (i.e., a vertical difference between points 116*a* and 116*b*) and the weight or mass of the electrified vehicle 104**.

While traveling down the downhill grade portion **112*a*, this potential energy is converted into kinetic energy of the moving electrified vehicle 104. This large amount of kinetic energy causes the electrified vehicle 104 to accelerate while traveling down the downhill grade portion 112*a*. Braking force must therefore be applied to decelerate the electrified vehicle 104 and maintain or regulate its speed. If other power dissipation methods, such as regenerative braking, are unavailable (e.g., due to a fully-charged battery system), this braking will involve selective activation or actuation of a friction brake system to apply frictional force to a driveline system of the electrified vehicle 104. During activation or actuation periods, energy accumulates in the friction brake system, which causes a temperature of the friction brake system to increase. During non-actuation periods, the friction brake system is cooled by the environment (i.e., airflow) to decrease the temperature of the friction brake system. Once a critical temperature is reached, usage of the friction brake system must be ceased to prevent potential brake fade (loss of brake pressure). This could cause message(s) to be output to a driver of the electrified vehicle 104** instructing she/he to stop activating/actuating the friction brake system. For example only, an initial driver warning instructing the driver to reduce friction brake system usage could be provided, followed by another subsequent driver warning instructing the driver to stop the electrified vehicle immediately to allow the friction brake system to cool.

Figure 2:
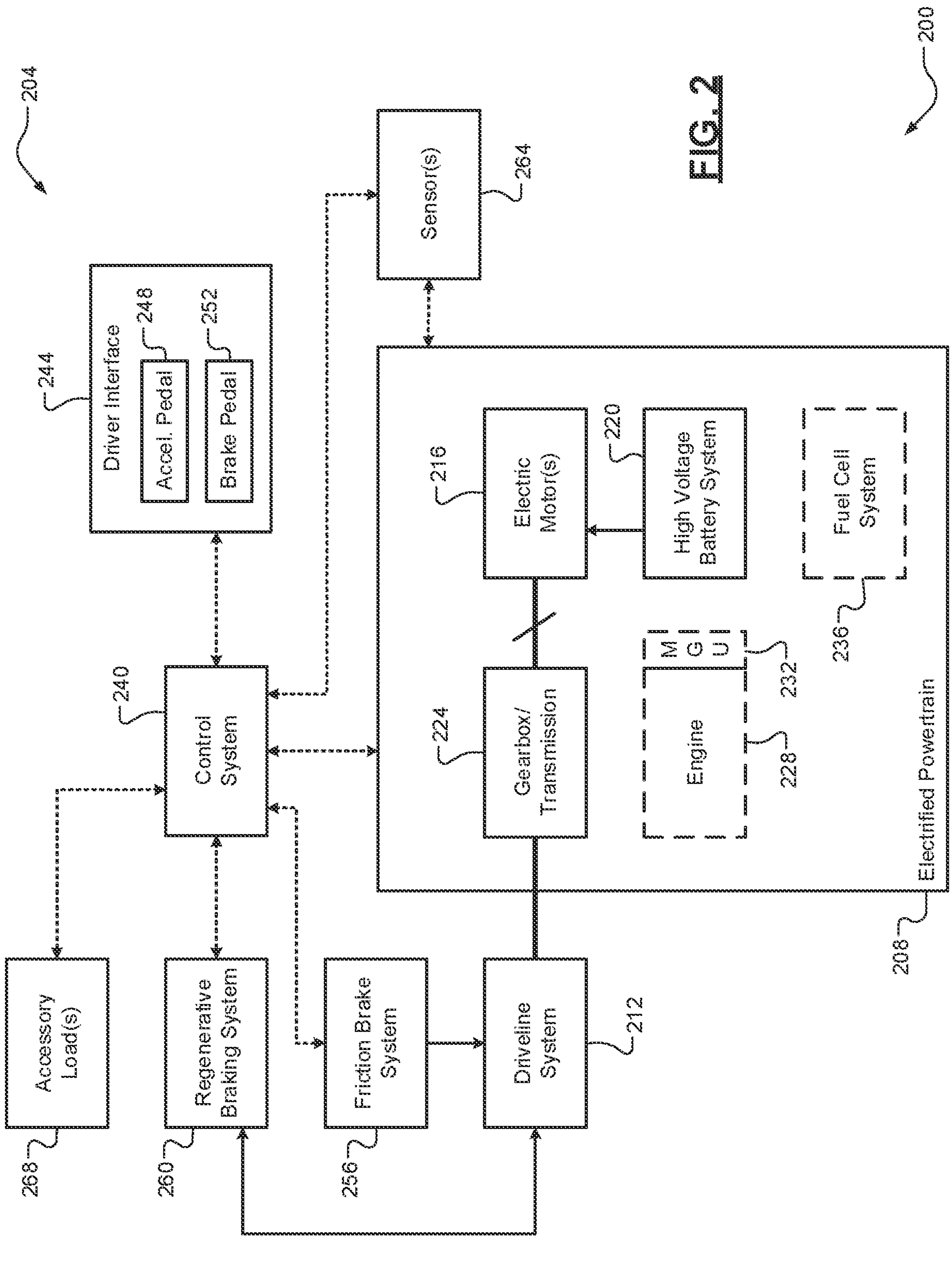
FIG. 2 is a functional block diagram of an example electrified vehicle having an example power dissipation control system according to the principles of the present application.

Referring now to FIG. 2, a functional block diagram of an example electrified vehicle 200 having an example power dissipation control system 204 according to the principles of the present application is illustrated. The electrified vehicle 200 generally comprises an electrified powertrain 208 configured to generate and transfer drive torque to a driveline system 212 for vehicle propulsion. The electrified powertrain 208 includes one or more electric traction motors 216 powered by a high voltage battery pack or system 220 and configured to generate drive torque. A gearbox or transmission 224 (e.g., a multi-speed automatic transmission) is configured to transfer the drive torque to the driveline system 212. In some implementations, the electrified powertrain 208 could further include an internal combustion engine 228 configured to combust a mixture of air and liquid fuel (diesel, gasoline, etc.) to generate torque. The torque generated by the engine 228 could be utilized, for example, to power a motor/generator unit (MGU) 232 to generate electrical energy for recharging the battery system 220. In other implementations, the electrified powertrain 208 could include a fuel cell system 236 for generating electrical energy to recharge the battery system 220.

The electrified vehicle 200 further comprises a controller or control system 240 configured to control operation of the electrified vehicle 200. This primarily includes controlling the electrified powertrain 208 to generate a desired amount of drive torque to satisfy a driver torque request provided via an accelerator pedal 248 of a driver interface 244. In one exemplary implementation, the control system 240 comprises a supervisory controller or hybrid control processor (HCP) configured to perform the majority of the aspects of the present application, including accessing, via a network, a friction brake system temperature model from another brake-related controller such as a body control module (BCM) or a brake system module (BSM). The driver interface 244 could include other driver-actuated components, such as a brake pedal 252 for controlling a friction brake system 256 of the electrified vehicle 200. The friction brake system 256 is configured to apply a frictional force at the driveline system 212 to decelerate and thereby reduce a speed of the electrified vehicle 200. The electrified vehicle 200 also includes a regenerative braking system 260 (also controlled by the brake pedal 252) that includes an electric motor (e.g., electric motor(s) 216) configured to be driven by the driveline system 212 (e.g., as a torque consumer or negative torque) and generate electrical energy, such as for recharging the battery system 220. The control system 240 is also configured to receive measurements from a set of sensors 264 of the electrified vehicle 200.

The set of sensors 264 are configured to measure/monitor, for example, shaft speeds, temperatures, pressures, and other suitable information. For example only, the set of sensors 264 could include a grade sensor and/or a navigation/map system configured to determine upcoming road parameters including road grade and an elevation sensor configured to determine elevation information. The control system 240 could also be configured to control/operate one or more accessory loads 268 (fans, compressors/pumps, heaters, etc.) as part of the power dissipation mode (i.e., to intentionally dissipate power that cannot be stored by the battery system 220 because it is at a full/maximum state of charge (SOC). The power dissipation mode, as previously discussed, involves utilizing any components to intentionally dissipate energy from the battery system 220 in anticipation of the regenerative braking energy that will be captured by the regenerative braking system 260 during the upcoming downhill grade. For range-extended electrified vehicle (REEV) or range-extended paradigm breaker (REPB) type configurations of the electrified powertrain 208 that also include an engine 228, motoring the engine 228 by the MGU 232 using the kinetic energy of the electrified vehicle 204 (i.e., at the driveline system 212) dissipates a large amount of power due to pumping losses of the engine 228. The power dissipation systems and methods of this application could thus be similarly implemented on these types of electrified vehicles.

Figure 3:
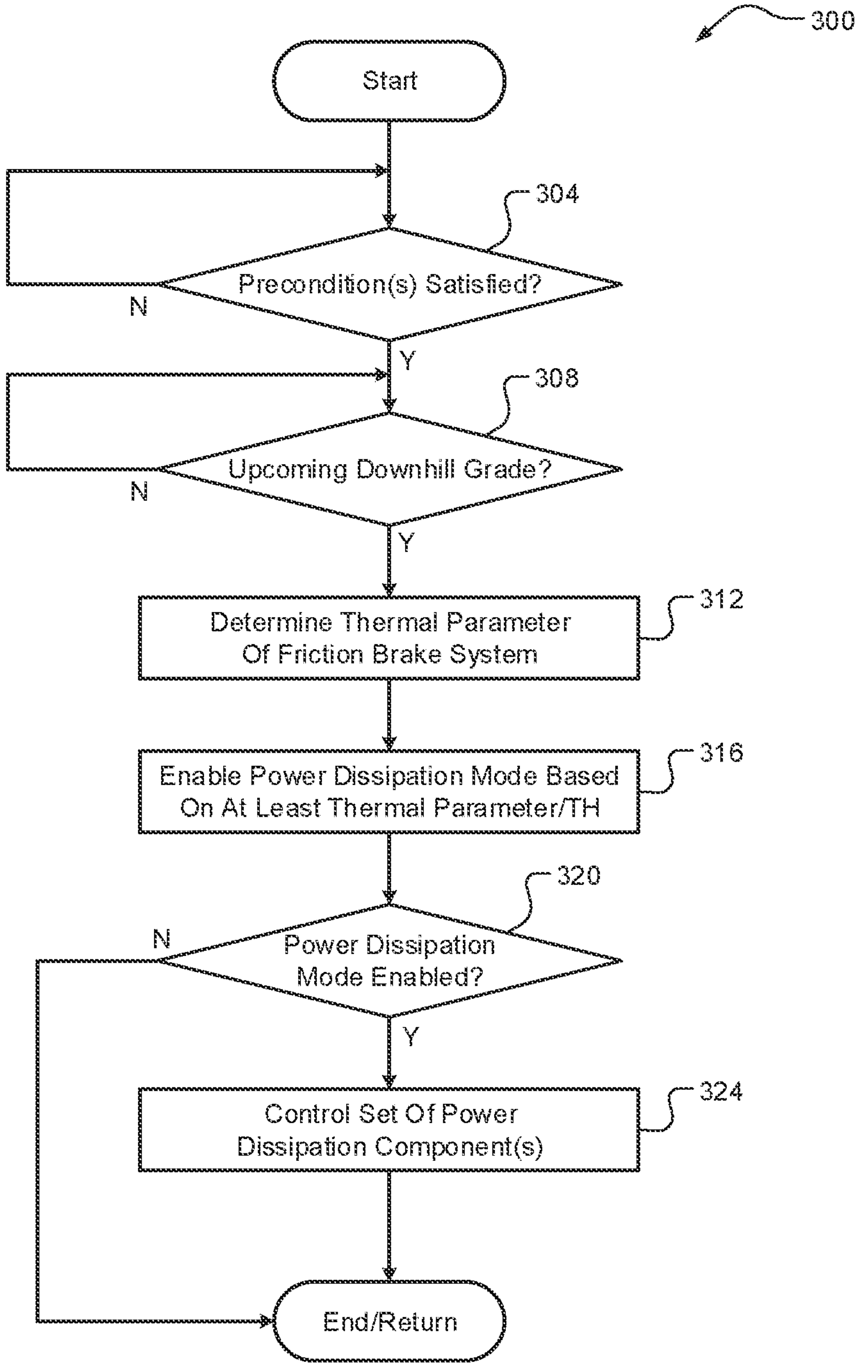
FIG. 3 is a flow diagram of an example power dissipation control method of an electrified vehicle according to the principles of the present application.

Referring now to FIG. 3, a flow diagram of an example power dissipation control method 300 of an electrified vehicle according to the principles of the present application is illustrated. While the electrified vehicle 200 and its components are specifically referenced for illustrative/descriptive purposes, it will be appreciated that the method 300 could be applicable to any suitably configured electrified vehicle. At optional 304, the control system 212 determines whether a set of one or more preconditions are satisfied. These precondition(s) could include, for example only, the electrified powertrain 208 being powered up and operational and there being no malfunctions or faults present that would negatively affect or otherwise inhibit operation of the techniques of the present application. At 308, the control system 212 determines whether a downhill grade is approaching or upcoming. When false, the method 300 ends or returns to 308. When true, the method 300 proceeds to 312. At 312, the control system 212 predicts the thermal parameter of the friction brake system 256 during (e.g., at the end of) the downhill grade. In other words, the control system 212 utilizes the thermal parameter to make a prediction about a future state of the friction brake system 256. This could involve using a temperature model (e.g., accessed via a network) or an accumulated energy based inference.

At 316, the control system 212 enables/disables the power dissipation mode of the electrified vehicle 200 based on at least this predicted thermal parameter and, in some cases, a corresponding thermal parameter threshold (TH) corresponding to the friction brake system 256 overheating. This could also account, for example, for the SOC of the battery system 220 (which could be, for example, at full/maximum SOC leading up to the downhill grade). In other words, information is taken that is needed to make the prediction that the regenerative energy (via the regenerative braking system 160) normally relied upon to absorb some of the energy of the friction brake system 156 will not be available and, as a result, the friction brake system will become overheated. When false or when the power dissipation mode is disabled, the method 300 ends or returns to 304. When true or when the power dissipation mode is enabled, the control system 212 controls the set of power dissipation systems to mitigate or reduce the thermal load on the friction brake system 256 during the downhill grade to thereby prevent the overheating of the friction brake system 256 (thus potentially preventing damage thereto and extending its useful life). The control of the power dissipation components includes controlling any of the power dissipation components as previously described to best dissipate electrical energy in the electrified vehicle 200, such as motoring of the engine 228 of the electrified powertrain 208 (for engine-configured applications). The method 300 then ends or returns to 304.

It will be appreciated that the terms "controller" and "control system" as used herein refer to any suitable control device or set of multiple control devices that is/are configured to perform at least a portion of the techniques of the present application. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present application. The one or more processors could be either a single processor or two or more processors operating in a parallel or distributed architecture.

It should also be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A control system for an electrified vehicle, the control system comprising:

a friction brake system configured to apply a frictional force to a driveline system of the electrified vehicle to decelerate the electrified vehicle; and a controller configured to, based on a set of operating parameters obtained using a set of sensors of the electrified vehicle, detect an upcoming downhill grade and, in response to detecting the upcoming downhill grade:

estimate a future energy accumulation of the friction brake system during the upcoming downhill grade, the estimated future energy accumulation including (i) an estimated accumulation energy accumulated by the friction brake system during actuation periods of the friction brake system and (ii) an estimated dissipation energy dissipated from the friction brake system during non-actuation periods of the friction brake system, wherein the estimated dissipation energy is based on an air-cooling energy decay rate of the friction brake system, and wherein the air-cooling energy decay rate is based on aerodynamics of the friction brake system and is indicative of an energy dissipation rate of energy from the friction brake system via air-cooling; and control enablement/disablement of a power dissipation mode of the electrified vehicle when the estimated future energy accumulation exceeds an energy accumulation threshold corresponding to overheating of the friction brake system, wherein the power dissipation mode includes intentionally dissipating at least some of the electrified vehicle's potential energy using a set of power dissipation components of the electrified vehicle.

2. The control system of claim 1, wherein the estimated future energy accumulation is further based on a modeled temperature of the friction brake system.

3. The control system of claim 2, wherein the controller is configured to access a temperature model for the friction brake system by a separate controller associated with the friction brake system, and wherein the temperature model is configured to model the temperature of the friction brake system based on a set of input parameters.

4. The control system of claim 3, wherein the controller is a supervisory controller or a hybrid control processor (HCP) and the separate controller associated with the friction brake system is a body control module (BCM) or brake system module (BSM).

5. The control system of claim 1, wherein the energy accumulation threshold corresponds to an overheat temperature of the friction brake system.

6. The control system of claim 1, wherein the set of power dissipation components includes a regenerative braking system of the electrified vehicle.

7. The control system of claim 6, wherein the set of power dissipation components includes an engine of the electrified powertrain, and wherein motoring the engine consumes at least some kinetic energy of the electrified vehicle during the downhill grade.

8. The control system of claim 6, wherein the set of power dissipation components further includes one or more accessory loads each configured to be powered by a high voltage battery system associated with the regenerative braking system.

9. A control method for an electrified vehicle, the control method comprising:

detecting, by a controller of the electrified vehicle and based on a set of operating parameters obtained using a set of sensors of the electrified vehicle, an upcoming downhill grade, wherein the electrified vehicle includes a friction brake system that is configured to apply a frictional force to a driveline system of the electrified vehicle to decelerate the electrified vehicle; and in response to detecting the upcoming downhill grade:

estimating, by the controller, a future energy accumulation of the friction brake system during the upcoming downhill grade, the estimated future energy accumulation including (i) an estimated accumulation energy accumulated by the friction brake system during the predicted actuation periods of the friction brake system and (ii) an estimated dissipation energy dissipated from the friction brake system during non-actuation periods, wherein the estimated dissipation energy is based on an air-cooling energy decay rate from the friction brake system, and wherein the air-cooling energy decay rate is based on aerodynamics of the friction brake system and is indicative of an energy dissipation rate of energy from the friction brake system via air-cooling; and controlling, by the controller, enablement/disablement of a power dissipation mode of the electrified vehicle when the estimated future energy accumulation exceeds an energy accumulation threshold corresponding to overheating of the friction brake system, wherein the power dissipation mode includes intentionally dissipating at least some of the electrified vehicle's potential energy using a set of power dissipation components of the electrified vehicle.

10. The control method of claim 9, wherein the estimated future energy accumulation is further based on a modeled temperature of the friction brake system.

11. The control method of claim 10, further comprising accessing, by the controller, a temperature model for the friction brake system from a separate controller associated with the friction brake system, wherein the temperature model is configured to model the temperature of the friction brake system based on a set of input parameters.

12. The control method of claim 11, wherein the controller is a supervisory controller or a hybrid control processor (HCP) and the separate controller associated with the friction brake system is a body control module (BCM) or brake system module (BSM).

13. The control method of claim 9, wherein the energy accumulation threshold is an accumulated energy by the friction brake system that corresponds to an overheat temperature of the friction brake system.

14. The control method of claim 9, wherein the set of power dissipation components includes a regenerative braking system of the electrified vehicle.

15. The control method of claim 14, wherein the set of power dissipation components includes an engine of the electrified powertrain, and wherein motoring the engine consumes at least some kinetic energy of the electrified vehicle during the downhill grade.

16. The control method of claim 14, wherein the set of power dissipation components further includes one or more accessory loads each configured to be powered by a high voltage battery system associated with the regenerative braking system.

* * * * *